Nov. 20, 1945.   A. C. HAGG ET AL   2,389,361
DYNAMOMETER
Filed March 12, 1942   2 Sheets-Sheet 1
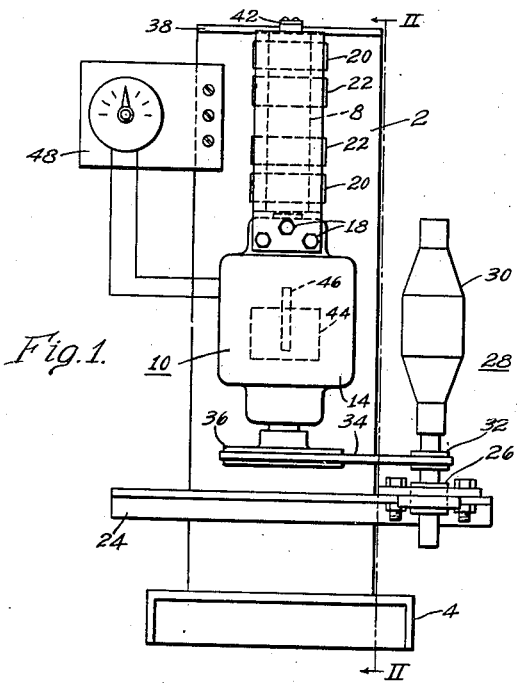
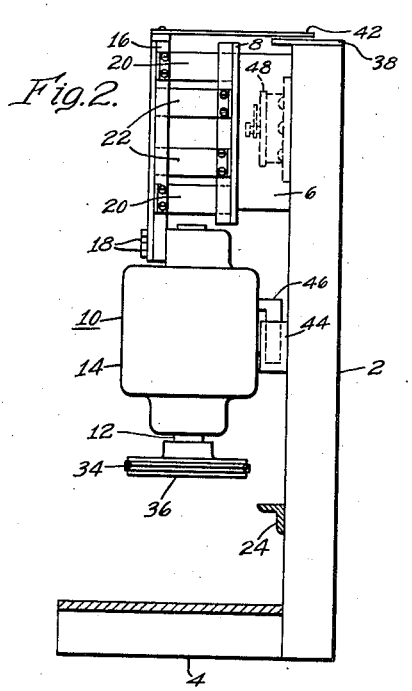
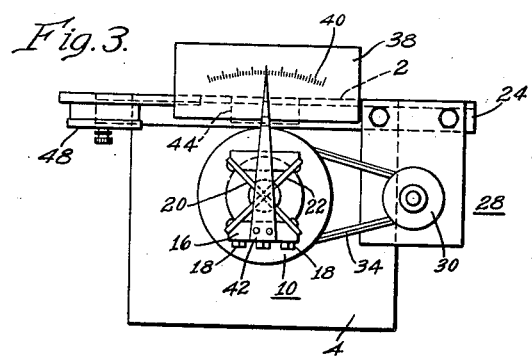
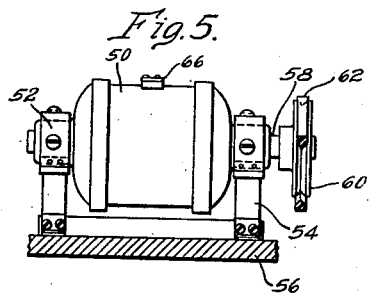
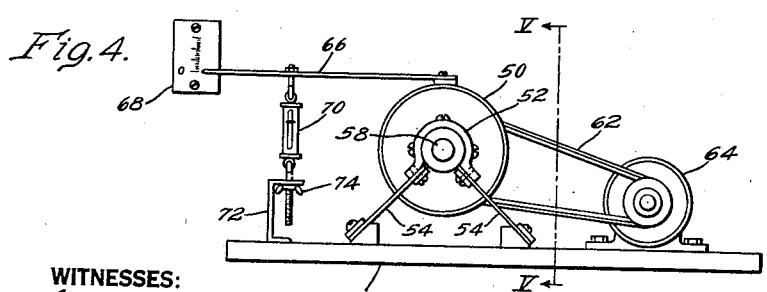
WITNESSES:
C. J. Weller.
David Kreider.
INVENTORS
Arthur C. Hagg and
John Boyd.
BY
ATTORNEY Nov. 20, 1945.   A. C. HAGG ET AL   2,389,361
DYNAMOMETER
Filed March 12, 1942    2 Sheets-Sheet 2

WITNESSES:

INVENTORS
Arthur C. Hagg and
John Boyd.
BY
ATTORNEY

Patented Nov. 20, 1945

2,389,361

UNITED STATES PATENT OFFICE 2,389,361

DYNAMOMETER

Arthur C. Hagg, Wilkinsburg, and John Boyd, Forest Hills, Pa., assignors to Westinghouse Electric Corporation, East Pittsburgh, Pa., a corporation of Pennsylvania Application March 12, 1942, Serial No. 434,318

5 Claims. (Cl. 73—134)

The present invention relates to dynamometers and it has particular relation to such devices embodying an improved spring mounting arrangement.

Dynamometers designed for measuring the output, bearing friction, windage, or the brush friction of rotating machinery are generally subject to the disadvantage that the friction or lost motion in the dynamometer mounting affects the results. The ordinary bearing mounted dynamometer is an example of the prior art in which this condition exists. According to the present invention, however, an elastic mounting arrangement is employed which substantially eliminates friction and other lost motion from the results and thus permits accurate torque and power determinations.

In one form of apparatus according to the present invention a dynamometer driving motor is elastically supported from a stationary base by means of crossed spring members engaging its casing. These spring members are angularly flexible in a plane perpendicular to the shaft of the motor and thus react to its torque output. The device undergoing test is connected to be driven from the motor by a pulley and belt arrangement or the like with the result that the casing is deflected about its axis to an extent depending upon the power or torque supplied and the characteristics of the spring mounting members. These spring members are arranged so as to intersect along the axis of the motor and the device may be calibrated so that the torque output is a linear function of the deflection of the casing. Instead of measuring the amount of deflection it is, of course, possible to apply balance weights or the like thereto in opposition to the induced torque. It will thus appear that the elastic mounting of the arrangement eliminates bearing friction and lost motion as previously pointed out.

It is accordingly an object of the present invention to provide a novel dynamometer which is capable of furnishing measurements of improved accuracy.

It is another object of the invention to provide a novel spring mounted dynamometer wherein the reaction of the spring mounting provides an indication of the torque being measured.

Another object of the invention is to provide a dynamometer in which the deflection of the casing of a spring mounted motor is dependent only upon the torque or power supplied thereby to equipment undergoing test.

A further object of the invention is to provide an improved spring mounted bearing dynamometer.

Other objects and advantages of the invention will appear from the following detailed description read in connection with the accompanying drawings in which:

Figure 1 is a front elevational view of apparatus adapted to measure the power consumption of a textile spindle and bobbin assembly;

Fig. 2 is a side elevational view of the apparatus of Fig. 1 with portions thereof in section and taken along the line II—II of Fig. 1;

Fig. 3 is a plan view of the apparatus of Figs. 1 and 2;

Fig. 4 is an elevational view of a modified form of the invention;

Fig. 5 is a view taken along the line V—V of Fig. 4;

Figure 6:
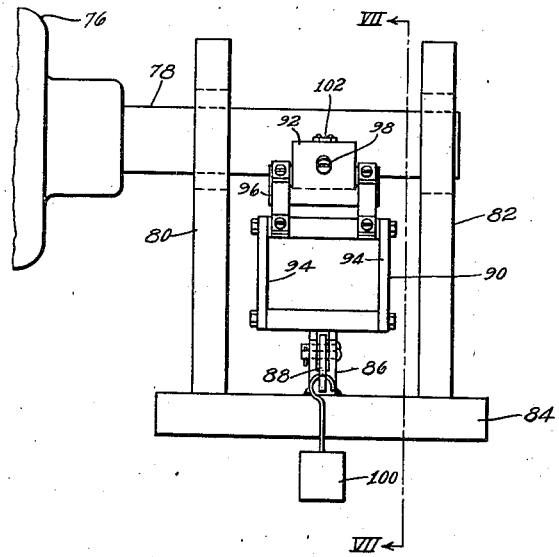
Fig. 6 is a front elevational view with portions cut away of equipment adapting the invention for the measurement of bearing friction.

Referring to Figs. 1, 2 and 3, which illustrate the invention applied to apparatus for measuring the power consumption of a textile spindle and bobbin assembly, a standard 2 is shown extending from a main base member 4. A metal strap 6 rigidly supports a supporting bar or base 8 in a vertical position from the standard 2. A dynamometer motor 10 which may be of the compound wound direct current type to provide adjustable but constant speeds includes a rotating shaft or spindle 12 and a casing 14. A vertical attaching bar 16 is secured to an end of the casing 14 as by means of bolts 18. Two pairs of crossed spring members 20 and 22, respectively, are secured to the supporting bar 8 and bar 16 to furnish support to the motor 10. The springs 20 and 22 are angularly disposed with respect to each other so as to intersect along the line of the axis of the motor shaft 12. In addition these spring straps are resilient in a horizontal plane perpendicular to their flat portions so that the mounting structure is angularly resilient in a plane perpendicular to the axis of rotation of the motor. While two pairs of these springs are preferably employed because of the additional rigidity provided along the motor axis, it will be evident that a single pair of such springs meet the primary requirements of the invention.

Also secured to the standard 2 is a supporting bar 24 adapted to receive the bearing structure 26 of a textile spindle designated generally as 28 which also includes a bobbin 30 about which a textile thread is adapted to be wound. The spindle in addition includes a pulley 32 which is engaged by a light belt 34 extending from a driving pulley 36 disposed on the shaft 12 of the motor 10.

To the upper end of the standard 2 is secured a dial 38 having a scale printed thereon at 40 for cooperation with an indicating arm 42 secured to the vertical attaching bar 16. The scale 40 will ordinarily be of the zero center type so as to indicate deflection of the motor casing and arm 42 for either direction or rotation of the motor.

A damping chamber 44 is secured to the standard 2 and is preferably filled with a heavy oil or similar fluid. A damping vane 46 is attached to the casing of the motor to extend into the fluid in this damping chamber and consequently dampen the deflection thereof as well as the indication of the pointer 42.

A suitable power supply (not shown) is employed to energize the motor 10 through a speed control device designated generally as 48.

In performing a test with this apparatus, the motor 10 is energized to operate at such a speed as to drive the spindle and bobbin assembly 28 at the desired testing speed. It may readily be determined when the desired speed obtains by applying a tachometer to the textile spindle in the manner well known in the art. With these conditions, the casing 14 of the motor 10 will be deflected about the axis of its spindle 12. The power required to drive the apparatus may readily be calculated from the torque valve determined from the position of the pointer 42 on the scale 40.

As previously pointed out the deflection of the springs with this particular construction is substantially linearly proportional to the torque output of the motor. The characteristics of this spring mounting correspond to an ordinary cantilever spring with a moment applied to the end. Calculations well known to those skilled in the art result in the following formula for the amount of torque per unit deflection of the casing:

$$\frac{M}{\theta'} = K = \frac{Eb t^3 N}{690 l}$$

where

M = applied moment
$\theta$ = angular deflection
E = modulus of elasticity of spring material
b = width of spring
t = thickness of spring
N = number of springs
l = length of spring While the above formula holds accurately for relatively wide deflections such as 15° or so, it will be advisable in many cases to calibrate the machine with dead weights or by means of a spring balance. The means of doing this will readily appear to those skilled in the art from the further description relating to modifications of the invention.

While this apparatus of Figs. 1 through 3 is shown as vertically mounted it will appear from a consideration of the principles set forth that the dynamometer motor may be horizontally mounted if desired.

In the modification of the invention shown in Figs. 4 and 5, a dynamometer motor 50 has clamps 52 rigidly secured to both ends of its casing to in turn engage angularly disposed spring straps 54. These springs are rigidly fixed to a base member 56 in such a manner that the extensions of the springs intersect along the axis of the motor. The rotatable shaft 58 of this motor carries a pulley 60 adapted to drive a belt 62 which may be disposed to drive the rotor of a motor 64 undergoing a test for friction losses or the like.

An indicating arm 66 is rigidly secured to the casing 50 in such a manner that its end normally is disposed at a zero point on a stationary scale 68. Along the arm 66 is secured a first end of a spring gage 70, the other end of which engages a clamp 72. One end of the gage is preferably supported in an adjustable manner so that its tension may be varied by means of a wing nut 74.

With this modified form of the invention the casing of the motor 50 is deflected upwardly in accordance with the power it transmits to the motor 64 when driving it in a clockwise direction in Fig. 4. However, the spring mounting arrangement employed here may not be linearly deflected by the torque over or under a range as desired so that it it is generally preferred to determine its value through the medium of the spring gage 70. With the system in stable operation the nut 74 is adjusted until the indicating arm 66 is brought to its zero position. In this condition the tension on the spring gage 70 furnishes an accurate indication of the torque output of the motor 50. Although this spring balance arrangement is preferred it will readily appear to those skilled in the art that weights might be applied to the arm 66 in opposition to the torque acting on the casing to bring it back to its normal undeflected position and in such a case the value of the weights will indicate the value of the torque output. If desired the apparatus may be calibrated by means of such weights and the scale 68 marked so that the displacement of the arm 66 provides an accurate indication of the torque.

Figure 7:
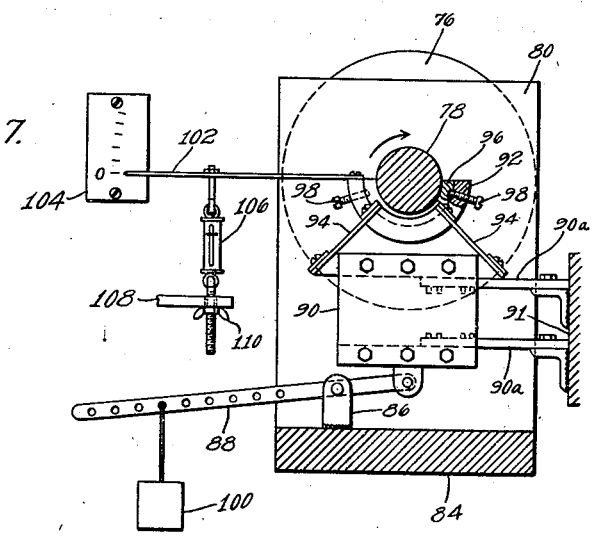
Fig. 7 is a sectional view of the apparatus of Fig. 6 taken along the line VII—VII of Fig. 6.

In the apparatus of Figs. 6 and 7 the invention is adapted to measure bearing friction. In this case a motor 76, only part of which is shown, drives a main shaft 78 which preferably rests in spaced bearing supports designated as 80 and 82, respectively. These bearings are adapted to keep the shaft 78 in proper alignment and prevent vibration which would otherwise seriously interfere with the accuracy of the results.

Secured to a base 84 which supports the bearings and standards 80 and 82 is a stud 86 which pivotally supports a lever 88. One end of this lever 88 is pivotally secured to a rigid base structure 90 to which is secured a bearing support or cradle 92 through angularly disposed spring members designated as 94. These spring members 94 are angularly flexible in a plane perpendicular to the axis of the shaft 78 and are so disposed that extensions thereof normally intersect at the center of the axis of the shaft.

The supporting member or cradle 92 has an open center portion within which may be disposed a semi-circular bearing 96 which is to be tested. This bearing is rigidly fixed relative to the support member by means of set screws 98 and a weight 100 disposed on the lever 88 acts to press the bearing upwardly against the shaft for frictional engagement therewith. Also secured to the supporting member 92 is an indicating arm 102 which is adapted to coincide with the zero point of a stationary scale 104 when the standard is in its normal undeflected position. A spring gage 106 is secured to the arm 102 and a fixed support 108 to exert a downward force on the arm tending to bring it towards its zero position.

Spaced link members 90a are secured to the base structure 90 and a stationary support 91 to permit the slight vertical movement of the base structure resulting from the variations in the upward pressure thereon while preventing accidental rotary movement thereof as a result of rotation of the shaft 78. To provide this result the links should be somewhat flexible in a vertical plane.

With the shaft 78 being driven in a clockwise direction as indicated by the arrow, its frictional engagement with the bearing 96 will tend to deflect the arm 102 in a clockwise direction away from the zero point on the scale. In order to determine the value of the torque impressed upon the supporting member the wing nut 110 is adjusted to bring the arm to zero position at which point the indication of the spring gage 106 furnishes a measurement of the desired torque.

With this last modification of the invention, various different bearings may be disposed within the supporting cradle 92 to have their frictional characteristics determined. During the tests the amount of force exerted on the bearing may very readily be varied and adjusted by changing the position of the weight 100 along the lever 88. It will likewise appear that with this modification balance weights might be attached to the arm 102 to obtain the torque measurement in lieu of employing the spring balance 106.

From the above description, the simplicity as well as the accuracy of the dynamometer of the present invention will be readily appreciated. As was previously pointed out, an important feature of the invention is that friction and lost motion in the dynamometer mounting are substantially eliminated. In addition the principles, described are readily adaptable to various different torque or power measuring problems.

Since various modifications of the specific forms of the apparatus shown and described by way of example will appear to those skilled in the art, it is intended that the invention shall be limited only by the spirit and scope of the appended claims.

We claim as our invention:

1. The combination in a dynamometer of a member disposed to be acted upon by a torque dependent upon the output of a rotating shaft, a base, a pair of flat springs normally disposed angularly to each other along lines intersecting the axis of said shaft to support said member relative to said base, said springs being angularly flexible in the direction of application of a torque acting upon said member as a result of rotation of said shaft, and means for determining the magnitude of a torque acting on said member by measuring the displacement of said member due to the flexing of springs reacting to such torque.

2. The combination in a dynamometer of a motor including a stationary portion and a rotatable shaft for driving a rotatable member, a base member, spring members attached to said base member at spaced points and angularly disposed to each other extending along lines intersecting the axis of said rotatable shaft to support the stationary portion of said motor in a manner to permit displacement thereof about said axis, means on the stationary portion of said motor for indicating its position relative to its normal undisplaced position when its rotatable shaft is stationary, and means for applying a known torque to said stationary portion in opposition to the torque produced by driving said rotatable member.

3. The combination in a dynamometer of a motor including a casing and a rotatable shaft for driving a rotatable member, a base member, a pair of crossed spring members engaging said casing to support said motor from said base member, said spring members being angularly flexible in a plane perpendicular to the axis of said rotatable shaft and normally intersecting in line therewith, and means for indicating the displacement of said casing relative to its normal undisplaced position to provide an indication of the torque applied to the rotatable member.

4. The combination in a dynamometer of a motor including a casing and a rotatable shaft for driving a rotatable member, a base member, a pair of crossed spring members engaging said casing to support said motor from said base member, said spring members normally intersecting in line with the axis of said rotatable shaft and being angularly flexible in the plane of rotation thereof to permit displacement of said casing in proportion to the torque applied to the rotatable member, means for indicating the displacement of said casing relative to its normal undisplaced position, a stationary damping chamber including a damping fluid therein, and a damping vane secured to said casing and disposed in said damping chamber to steady the displacement of said casing.

5. In a dynamometer including a rotor mounted for rotation on a shaft, a stationary field member for cooperation therewith and means on said shaft for transmitting the torque thereof to a rotatable member, a base, means for resiliently supporting said field member on said base to permit displacement of said field member in response to torque transmitted to said rotatable member, said means comprising a pair of flat spring members connecting said field member and base and resilient in a direction perpendicular to the axis of said rotor shaft, means for measuring the displacement of said field member in response to the torque transmitted to said rotatable member, and means for damping such displacement.

ARTHUR C. HAGG.
JOHN BOYD.